(12) United States Patent
Zhang (10) Patent No.: US 11,218,741 B2
(45) Date of Patent: Jan. 4, 2022

(54) METHOD, APPARATUS, ELECTRONIC DEVICE AND COMPUTER-READABLE STORAGE MEDIUM FOR VIDEO BUFFERING

(71) Applicant: ALIBABA GROUP HOLDING LIMITED, Grand Cayman (KY)

(72) Inventor: Yifeng Zhang, Guangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/889,707

(22) Filed: Jun. 1, 2020

(65) Prior Publication Data
US 2020/0382820 A1    Dec. 3, 2020

(30) Foreign Application Priority Data
Jun. 3, 2019 (CN) .......................... 201910478077.2

(51) Int. Cl.
*H04N 21/234* (2011.01)
*H04N 21/2343* (2011.01)

(52) U.S. Cl.
CPC . *H04N 21/23406* (2013.01); *H04N 21/23412* (2013.01); *H04N 21/234327* (2013.01)

(58) Field of Classification Search
CPC ....... H04N 21/23406; H04N 21/23412; H04N 21/234327
See application file for complete search history.

(56) References Cited

U.S. PATENT DOCUMENTS

| | | |
|---|---|---|
| 2002/0164024 A1* | 11/2002 | Arakawa ................ H04L 69/16 380/210 |
| 2003/0061369 A1 | 2/2003 | Aksu et al. |
| 2006/0171658 A1 | 8/2006 | Jochemsen et al. |
| 2007/0130498 A1 | 6/2007 | Hannuksela et al. |
| 2009/0274437 A1 | 11/2009 | Stiers et al. |
| 2010/0290536 A1 | 11/2010 | Iwahashi et al. |
| 2010/0329647 A1 | 12/2010 | Kim et al. |
| 2011/0083037 A1 | 4/2011 | Bocharov et al. |
| 2011/0083144 A1 | 4/2011 | Bocharov et al. |
| 2011/0087794 A1 | 4/2011 | Li et al. |
| 2011/0119395 A1 | 5/2011 | Ha et al. |
| 2011/0302618 A1 | 12/2011 | Odlund et al. |

(Continued)

FOREIGN PATENT DOCUMENTS

CN    109168023 A    1/2019

OTHER PUBLICATIONS

First Examination Report for Indian Application No. 202044023212 dated Nov. 9, 2021.

*Primary Examiner* — Joshua D Taylor (57) ABSTRACT

Methods, systems, and apparatus, including computer programs encoded on computer storage media, for video buffering are provided. One of methods includes: determining a buffered video interval in a video according to a video play position and a video buffered position of the video; determining a to-be-buffered target video interval in the video based on the buffered video interval; performing fragmentation on a video part that is not buffered, not fragmented, and in the to-be-buffered target video interval, to obtain at least one fragment; and buffering each of the at least one fragment.

18 Claims, 4 Drawing Sheets

(56) References Cited

U.S. PATENT DOCUMENTS

| | | |
|---|---|---|
| 2013/0227293 A1* | 8/2013 | Leddy .................. H04N 21/845 713/176 |
| 2014/0007172 A1 | 1/2014 | Rhyu et al. |
| 2014/0156863 A1* | 6/2014 | Gao .................... H04L 65/4084 709/231 |
| 2016/0255381 A1 | 9/2016 | Denoual et al. |
| 2017/0302717 A1 | 10/2017 | Karlsson et al. |

* cited by examiner

METHOD, APPARATUS, ELECTRONIC DEVICE AND COMPUTER-READABLE STORAGE MEDIUM FOR VIDEO BUFFERING

CROSS REFERENCE TO RELATED APPLICATION

The application is based on and claims priority to Chinese Patent Application No. 201910478077.2, filed on Jun. 3, 2019, which is incorporated herein by reference in its entirety.

TECHNICAL FIELD

The application relates to the field of video processing technologies, and in particular, to a video buffering method, a video buffering apparatus, an electronic device, and a computer readable storage medium.

BACKGROUND

With an increase in Wi-Fi speed and popularization of 4G networks, network speeds of user terminals increase significantly, allowing content consumed by users to change from pictures and text to videos, resulting in more bandwidth contentions between terminal devices of the users.

When a video is being played, to ensure that a user can play the video smoothly, enough consecutive data needs to be buffered. Currently, a video is buffered by using a concurrence manner. However, concurrent buffering may lead to non-consecutive data chunks, resulting in video playback stalling.

SUMMARY

The application provides embodiments of video buffering. According to a first aspect of the application, a video buffering method is provided, including: determining a buffered video interval in a video according to a video play position and a video buffered position of the video; determining a to-be-buffered target video interval in the video based on the buffered video interval; performing fragmentation on a video part that is not buffered, not fragmented, and in the to-be-buffered target video interval, to obtain at least one fragment; and buffering each of the at least one fragment.

In some embodiments, determining a to-be-buffered target video interval in the video based on the buffered video interval comprises: obtaining a length value of the buffered video interval and a preset proportionality coefficient; determining a length value of the to-be-buffered target video interval by using the length value of the buffered video interval and the preset proportionality coefficient; and determining the to-be-buffered target video interval by using the length value of the to-be-buffered target video interval and the video buffered position of the video.

In some embodiments, the method further comprises: obtaining a length value of a preset minimum buffered video interval; comparing the length value of the buffered video interval with the length value of the minimum buffered video interval; determining the length value of the to-be-buffered target video interval by using the length value of the buffered video interval and the preset proportionality coefficient in response to the length value of the buffered video interval being greater than the length value of the minimum buffered video interval; and determining the length value of the to-be-buffered target video interval to be the length value of the minimum buffered video interval in response to the length value of the buffered video interval being not greater than the length value of the minimum buffered video interval.

In some embodiments, performing fragmentation on a video part that is not buffered, not fragmented, and in the to-be-buffered target video interval, to obtain at least one fragment, comprises: obtaining a pre-configured quantity of fragments and the length value of the to-be-buffered target video interval; determining a length upper limit of a single fragment according to the pre-configured quantity of fragments and the length value of the to-be-buffered target video interval; and performing fragmentation on the video part that is not buffered, not fragmented, and in the to-be-buffered target video interval by using the length upper limit of a single fragment, to obtain at least one fragment.

In some embodiments, the method further comprises: determining whether there is any buffered video part in the to-be-buffered target video interval; in response to determining that there is a buffered video part in the to-be-buffered target video interval, extending the to-be-buffered target video interval by using a first preset extension coefficient to obtain a first extended to-be-buffered target video interval; and performing fragmentation on a video part that is not buffered, not fragmented and in the first extended to-be-buffered target video interval to obtain at least one fragment.

In some embodiments, the method further comprises: canceling buffering of a fragment outside the to-be-buffered target video interval.

In some embodiments, canceling buffering of a fragment outside the to-be-buffered target video interval comprises: determining whether a fragment falls outside the to-be-buffered target video interval; in response to determining that a part of the fragment falls outside the to-be-buffered target video interval, determining whether a buffered position of the fragment is located in the to-be-buffered target video interval; and in response to determining that a buffered position of the fragment is not located in the to-be-buffered target video interval, canceling buffering of the fragment.

In some embodiments, the method further comprises: obtaining a second preset extension coefficient; obtaining a second extended to-be-buffered target video interval based on the second preset extension coefficient and the to-be-buffered target video interval; and canceling buffering of a fragment outside the second extended to-be-buffered target video interval.

In some embodiments, the method further comprises: performing secondary fragmentation on a fragment that is not completely buffered and in the to-be-buffered target video interval, to add at least one new fragment; and respectively buffering the fragments obtained through the secondary fragmentation.

According to a second aspect of the application, a video buffering apparatus is provided, including: one or more processors and one or more non-transitory computer-readable memories coupled to the one or more processors and configured with instructions executable by the one or more processors to cause the apparatus to perform operations comprising: determining a buffered video interval in a video according to a video play position and a video buffered position of the video; determining a to-be-buffered target video interval in the video based on the buffered video interval; performing fragmentation on a video part that is not buffered, not fragmented, and in the to-be-buffered target video interval, to obtain at least one fragment; and buffering each of the at least one fragment.

According to a third aspect of the application, a non-transitory computer-readable storage medium is provided. The non-transitory computer-readable storage medium is configured with instructions executable by one or more processors to cause the one or more processors to perform operations comprising: determining a buffered video interval in a video according to a video play position and a video buffered position of the video; determining a to-be-buffered target video interval in the video based on the buffered video interval; performing fragmentation on a video part that is not buffered, not fragmented, and in the to-be-buffered target video interval, to obtain at least one fragment; and buffering each of the at least one fragment.

According to some embodiments of the application, a buffered video interval in a video is determined according to a video play position and a video buffered position of the video; a to-be-buffered target video interval is determined based on the buffered video interval in the video; fragmentation is performed on a video part that is not buffered, not fragmented, and in the to-be-buffered target video interval, to obtain at least one fragment; and each of the at least one fragment is buffered. In this manner of adaptive and dynamic fragmentation of a video, buffering time of the video decreases, and the problem of video playback stalling is effectively prevented.

Embodiments of the application are described in detail with reference to the accompanying drawings, and other features and advantages of the application will be clear.

BRIEF DESCRIPTION OF THE DRAWINGS

The accompanying drawings that are incorporated in and constitute a part of the specification illustrate embodiments of the application, and are used to explain, together with their descriptions, the principles of the application.

DETAILED DESCRIPTION

Various embodiments of the application are described herein in detail with reference to the accompanying drawings. It should be noted that, unless otherwise indicated, relative configurations, numerical expressions, and values of parts and steps described in the embodiments are not intended to limit the scope of the application.

The following descriptions of at least one embodiment are merely illustrative, and should not be construed as any limitation on applications or usage of the application.

Technologies, methods, and devices known by a person of ordinary skill in the art may not be discussed in detail, but in proper situations, these technologies, methods, and devices should be considered as a part of the specification.

In all shown and discussed examples, any value should be explained as being merely illustrative, rather than being limitative. Therefore, different values may be included in other examples of the embodiments.

It should be noted that: similar reference characters, numbers, and letters represent similar items in the following accompanying drawings. Therefore, once defined in an accompanying drawing, an item may or may not be further discussed in the following accompanying drawings.

<Hardware Configuration>

Figure 1:
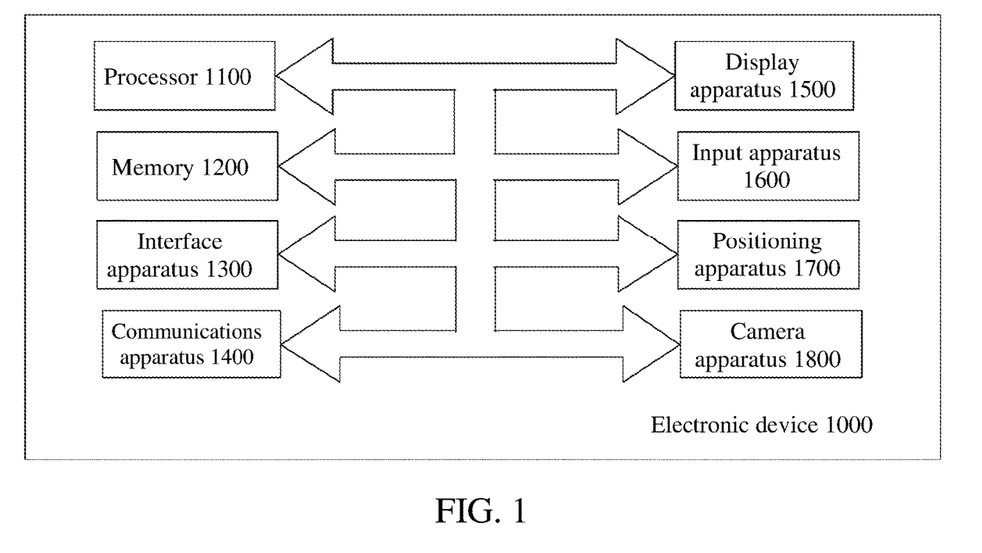
FIG. 1 is a block diagram of a hardware configuration of an electronic device configured to implement a method, according to some embodiments of the application.

FIG. 1 is a block diagram of a hardware configuration of an electronic device configured to implement a method according to any embodiment of the application.

In some embodiments, the electronic device may be a terminal device 1000 such as a mobile phone, a hand-held computer, or a notebook computer. This is not limited herein.

In the embodiments, as shown in FIG. 1, a terminal device 1000 may include a processor 1100, a memory 1200, an interface apparatus 1300, a communications apparatus 1400, a display apparatus 1500, an input apparatus 1600, a positioning apparatus 1700, a camera apparatus 1800, and the like.

The processor 1100 may be a mobile processor. The memory 1200 includes, for example, a read-only memory (ROM), a random access memory (RAM), a nonvolatile memory such as a hard disk, or the like. The interface apparatus 1300 includes, for example, a universal serial bus (USB) interface, an earphone interface, or the like. The communications apparatus 1400 may perform, for example, wired or wireless communication. The display apparatus 1500 may be, for example, a liquid crystal display, a touchscreen, or the like. The input apparatus 1600 may be, for example, a touchscreen, a keyboard, or the like. The positioning apparatus 1700 is configured to provide a positioning function, and may be, for example, a global positioning system (GPS) positioning module, a Beidou positioning module, or the like. The camera apparatus 1800 may be, for example, one or more cameras having functions of picture shooting, video shooting, and two-dimensional barcode scanning.

Although a plurality of apparatus of the terminal device 1000 are shown in FIG. 1, the application may include some of the plurality of apparatus. For example, the terminal device 1000 includes the memory 1200, the processor 1100, and the camera apparatus 1800. Alternatively, the terminal device 1000 includes the memory 1200, the processor 1100, the positioning apparatus 1700, and the camera apparatus 1800.

In the embodiments, the memory 1200 of the terminal device 1000 is configured to store instructions, and the instructions are used to control the processor 1100 to perform operations to implement at least a video buffering method according to any embodiment of the application. A person skilled in the art may design the instructions according to the embodiments disclosed in the application. How the instructions controls the processor to perform operations are not described in detail herein.

Method Embodiments

Figure 2:
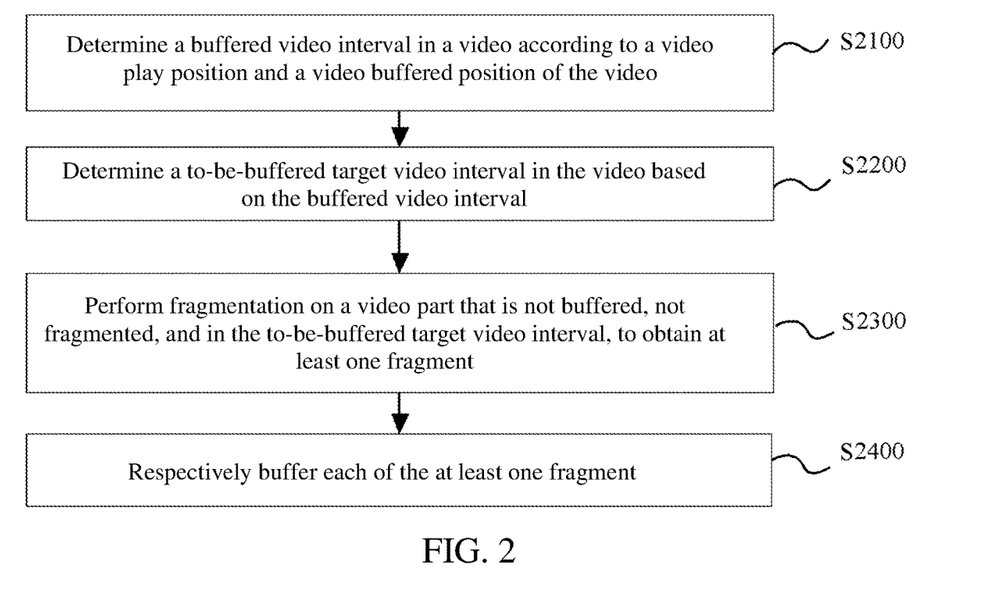
FIG. 2 is a processing flowchart of a video buffering method, according to some embodiments of the application.

FIG. 2 is a processing flowchart of a video buffering method according to some embodiments of the application. The method is performed by the terminal device 1000 in FIG. 1.

As shown in FIG. 2, the video buffering method may include the following steps S2100 to S2400.

Step S2100: determining a buffered video interval in a video according to a video play position and a video buffered position of the video.

In some embodiments, the buffered video interval in a video is a consecutive interval in the video, and there is no data that is not buffered in the consecutive interval. That is, all data in the buffered video interval has been buffered. A video play position is the position (e.g., $x^{th}$ second) of a video to which the video is played. A video buffered position is the position (e.g., $y^{th}$ second) of a video to which the video is buffered.

Step S2200: determining a to-be-buffered target video interval in the video based on the buffered video interval.

In some embodiments, step S2200 further includes steps S2210 to S2230.

Step S2210: obtaining a length value of the buffered video interval and a preset proportionality coefficient.

The length value (or the value of the length) of the buffered video interval may be obtained according to a video play position and a video buffered position. For example, the video play position is the $x^{th}$ second of a video, and the video buffered position is the $y^{th}$ second of the video, and then (y-x) is the length value of the buffered video interval.

The preset proportionality coefficient is a ratio of the length value of the buffered video interval to a length value of the to-be-buffered target video interval. The preset proportionality coefficient may be set to, for example, 0.9, 1, or 1.1 according to video buffering requirements.

Step S2220: determining a length value of the to-be-buffered target video interval by using the length value of the buffered video interval and the preset proportionality coefficient.

Step S2230: determining the to-be-buffered target video interval by using the length value of the to-be-buffered target video interval.

A starting position of the to-be-buffered target video interval may be the video buffered position. An end position of the to-be-buffered target video interval may be obtained according to the starting position of the to-be-buffered target video interval and the length value of the to-be-buffered target video interval.

In some embodiments, step S2200 may further include steps S2240 to S2260.

Step S2240: obtaining a length value of a preset minimum buffered video interval.

Playback stalling may often occur when playback of the video is started. To avoid this problem, before the playback of the video is started, a volume of data can be buffered (for example, 1 s, 2 s, and 5 s). A length value corresponding to the volume of the data buffered before the start of the play of the video is the length value of the minimum buffered video interval.

Step S2250: comparing the length value of the buffered video interval with the length value of the minimum buffered video interval, to obtain a comparison result.

When the comparison result is that the length value of the buffered video interval is greater than the length value of the minimum buffered video interval, the operation included in step S2220 is performed.

When the comparison result is that the length value of the buffered video interval is not greater than the length value of the minimum buffered video interval, step S2260 is performed: using the length value of the minimum buffered video interval as the length value of the to-be-buffered target video interval.

In some embodiments, when the end position of the to-be-buffered target video interval falls outside an end position of the video, the end position of the video is deemed as the end position of the to-be-buffered target video interval. For example, if the end position of the to-be-buffered target video interval corresponds to the $1100^{th}$ second of the video, and the end position of the video is the $1000^{th}$ second of the video, a position of the video corresponding to the $1000^{th}$ second is deemed as the end position of the to-be-buffered target video interval.

Step S2300: performing fragmentation on a video part that is not buffered, not fragmented, and in the to-be-buffered target video interval, to obtain at least one fragment.

In some embodiments, step S2300 further includes steps S2310 to S2330.

Step S2310: obtaining the pre-configured quantity of fragments and the length value of the to-be-buffered target video interval.

The pre-configured quantity of fragments may be set according to the video buffering requirements. For example, the pre-configured quantity of fragments may be 2, 5, 10, 20, etc.

Step S2320: determining a length upper limit of a single fragment according to the pre-configured quantity of fragments and the length value of the to-be-buffered target video interval.

In some embodiments, the length upper limit of a single fragment may refer to the upper limit of the length of a single fragment. The length upper limit $l_{single}$ of a single fragment may be obtained based on the following formula (1):

$$l_{single}=l_1/q_1 \qquad \text{formula (1)}$$

wherein, $l_1$ is the length value of the to-be-buffered target video interval, and $q_1$ is the pre-configured quantity of fragments.

Step S2330: performing fragmentation on a video part that is not buffered, not fragmented, and in the to-be-buffered target video interval by using the length upper limit of a single fragment, to obtain at least one fragment.

In some embodiments, the quantity $q_2$ of fragments after fragmentation is performed on the video part that is not buffered, not fragmented, and in the to-be-buffered target video interval may be obtained based on the following formula (2):

$$q_2=\text{ceil}(l_2/l_{single}) \qquad \text{formula (2)}$$

wherein, ceil is a ceiling function, and $l_2$ is a length value of the video part that is not buffered, not fragmented, and in the to-be-buffered target video interval.

Figure 3:
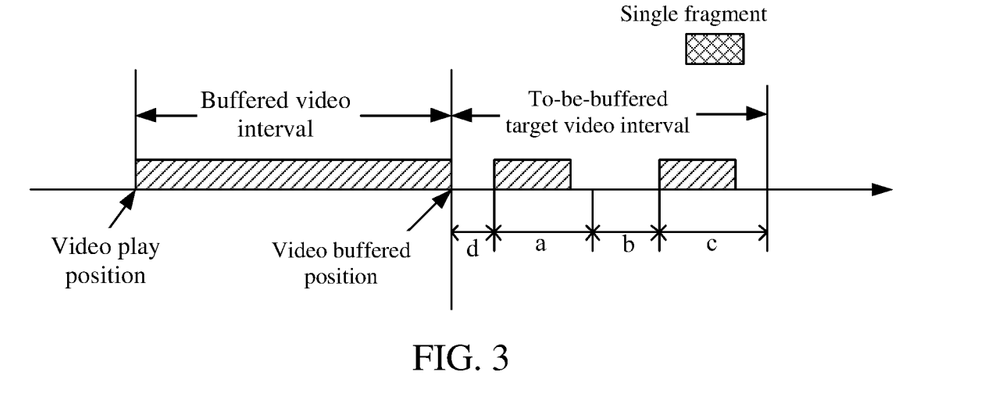
FIG. 3 is a schematic diagram of display of a buffered video interval and a to-be-buffered target video interval, according to some embodiments of the application.

As shown in FIG. 3, in the to-be-buffered target video interval, fragments that are being buffered and that have been fragmented are a and c, a fragment that is not buffered, but is fragmented, and in the to-be-buffered target video interval is b, and a video part that is not buffered, not fragmented, and in the to-be-buffered target video interval is d. Fragmentation is performed on the video part d by using the length upper limit of a single fragment, to obtain one or more corresponding fragments.

Referring to FIG. 3, the length value of the video part d that is not buffered, not fragmented, and in the to-bebuffered target video interval is less than the length upper limit of a single fragment (that is, the length value of a single fragment shown on the upper right corner of FIG. 3). Based on the foregoing formula (2), the quantity of the one or more obtained fragments is one.

Figure 4:
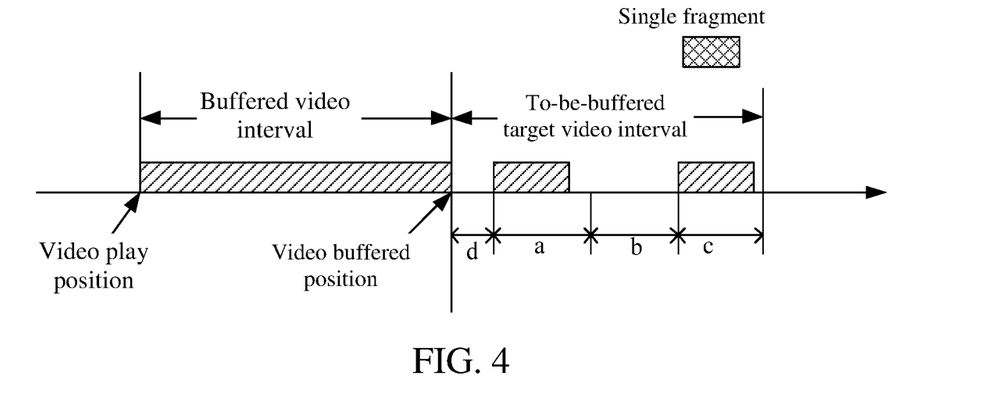
FIG. 4 is a schematic diagram of display of a buffered video interval and a to-be-buffered target video interval, according to other embodiments of the application.

As shown in FIG. 4, in the to-be-buffered target video interval, fragments that are being buffered and that have been fragmented are a and c, and video parts that are not buffered, not fragmented, and in the to-be-buffered target video interval are b and d. Fragmentation is performed on the video part b and the video part d respectively by using the length upper limit of a single fragment, to obtain corresponding fragments.

Referring to FIG. 4, the length value of the video part d that is not buffered, not fragmented, and in the to-be-buffered target video interval is less than the length upper limit of a single fragment (that is, the length value of a single fragment shown on the upper right corner of FIG. 4), and based on the foregoing formula (2), the quantity of the obtained fragments corresponding to the video part d is one. The length value of the video part b that is not buffered, not fragmented, and in the to-be-buffered target video interval is between the length upper limit of a single fragment and the length upper limit of two single fragments, and based on the foregoing formula (2), the quantity of the obtained fragments corresponding to the video part b is two.

Step S2400: respectively buffering the fragments.

For example, the method may start buffering each of the fragments in parallel. In other examples, the method may buffer each of the fragments in other manners.

A trigger event of the video buffering method provided by the embodiments of the application may be any one of the following: parsing of mov completes before the video is played, a video play position changes, and a buffer task of the to-be-buffered target video interval is completed. In the embodiments, mov refers to description information in a video file which describes the positions of an image frame and audio at a time in the video file. For example, mov stores a file block of metadata required for video playback, which includes position information of images and audio of the $x^{th}$ second of the video. In some embodiments, mov also stores information of key image frames.

In some embodiments, the video buffering method may include the following steps S2500 to S2600.

Step S2500: determining whether there is any buffered video part in the to-be-buffered target video interval, to obtain a determining result.

Step S2600: when the determining result is that there is a buffered video part in the to-be-buffered target video interval, extending the to-be-buffered target video interval by using a first preset extension coefficient to obtain a first extended to-be-buffered target video interval.

The first preset proportionality coefficient may be set to, for example, 0.2, 0.3, or 0.4 according to the video buffering requirements.

In some embodiments, a length value of the first extended to-be-buffered target video interval is obtained by using the first preset extension coefficient, the length value of the to-be-buffered target video interval, and a length value of the buffered video part of the to-be-buffered target video interval.

The length value of the first extended to-be-buffered target video interval may be obtained based on the following formula (3):

$$l_{extended} = l_1 + l_3 * e \quad \text{formula (3)}$$

wherein, $l_{extended}$ is the length value of the first extended to-be-buffered target video interval, $l_1$ is the length value of the to-be-buffered video interval, $l_3$ is the length value of the buffered video part of the to-be-buffered target video interval, and e is the first preset extension coefficient.

As shown in FIG. 3 and FIG. 4, there is at least one buffered video part in each of the to-be-buffered target video intervals. Thus, the to-be-buffered target video interval may be extended, to obtain the first extended to-be-buffered target video interval.

In some embodiments, step S2300 further includes performing fragmentation on a video part that is not buffered, not fragmented, and in the first extended to-be-buffered target video interval, to obtain at least one fragment.

The video play position provided by the embodiments may change based on a trigger operation of a user. For example, a user may move a current video play position by dragging or clicking a related functional button of a video player. The video play position may change corresponding to the user's dragging or clicking. When the video play position changes, the buffered video interval changes, and correspondingly, the to-be-buffered target video interval also changes.

In some embodiments, when the to-be-buffered target video interval changes, the video buffering method further includes step S2700: cancelling buffering of a fragment outside the to-be-buffered target video interval. In this way, buffering a fragment at an inappropriate position may be canceled in time, thereby preventing buffering of a fragment at an inappropriate position from occupying resources.

The fragment falling outside the to-be-buffered target video interval includes two situations: one is that the entire piece of the fragment is not located in the to-be-buffered target video interval anymore, and the other is that a part of the fragment falls outside the to-be-buffered target video interval.

In the situation where the entire piece of the fragment is not located in the to-be-buffered target video interval anymore, buffering of the fragment is canceled.

In the situation where a part of the fragment falls outside the to-be-buffered target video interval, whether to cancel the buffering of the fragment is determined according to whether a current buffered position of the fragment is located in the to-be-buffered target video interval. When the current buffered position of the fragment is located in the to-be-buffered target video interval, buffering of the fragment may continue. When the current buffered position of the fragment is not located in the to-be-buffered target video interval, buffering of the fragment is canceled.

Figure 5:
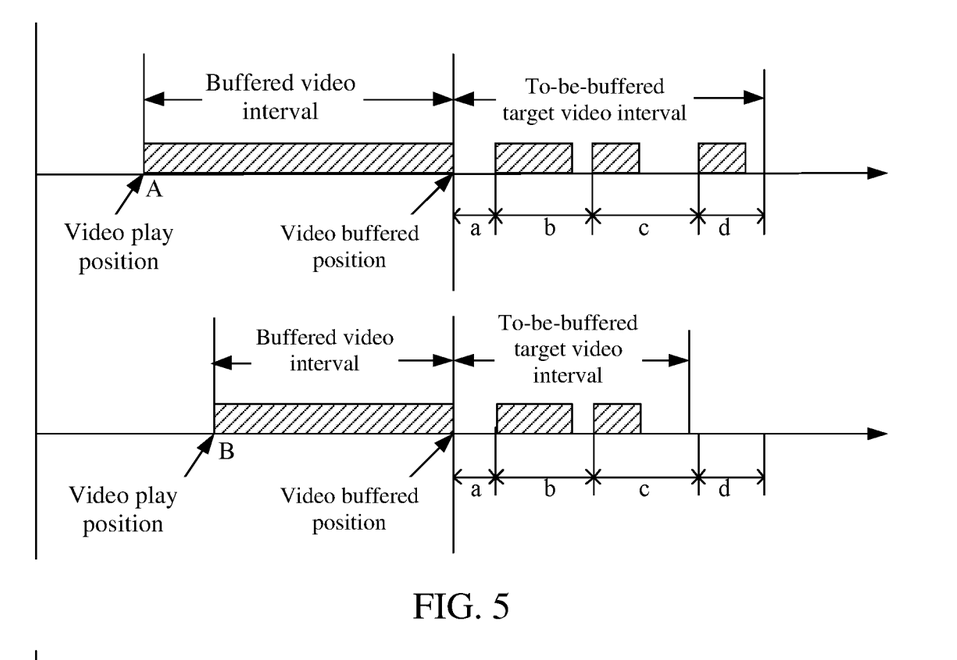
FIG. 5 is a schematic diagram of display of a buffered video interval and a to-be-buffered target video interval, according to still other embodiments of the application.

For example, as shown in FIG. 5, the video play position moves forward based on an operation triggered by the user, that is, moving forward from a play position A to a play position B. The buffered video interval contracts, and correspondingly, the to-be-buffered target video interval also contracts.

Referring to FIG. 5, a schematic diagram located on an upper half part of FIG. 5 is a schematic diagram of the buffered video interval and the to-be-buffered target video interval before the video play position changes. A schematic diagram located on a lower half part of FIG. 5 is a schematic diagram of the buffered video interval and the to-be-buffered target video interval after the video play position changes.

As shown in FIG. 5, before the to-be-buffered target video interval contracts, the fragment a, the fragment b, the fragment c, and the fragment d of the to-be-buffered target video interval are being respectively buffered. After the to-be-buffered target video interval contracts, the fragment d is not located in the to-be-buffered target video interval anymore. Accordingly, buffering of the fragment d is canceled. A current buffered position of the fragment c does not fall outside the to-be-buffered target video interval, buffering of the fragment c continues.

Figure 6:
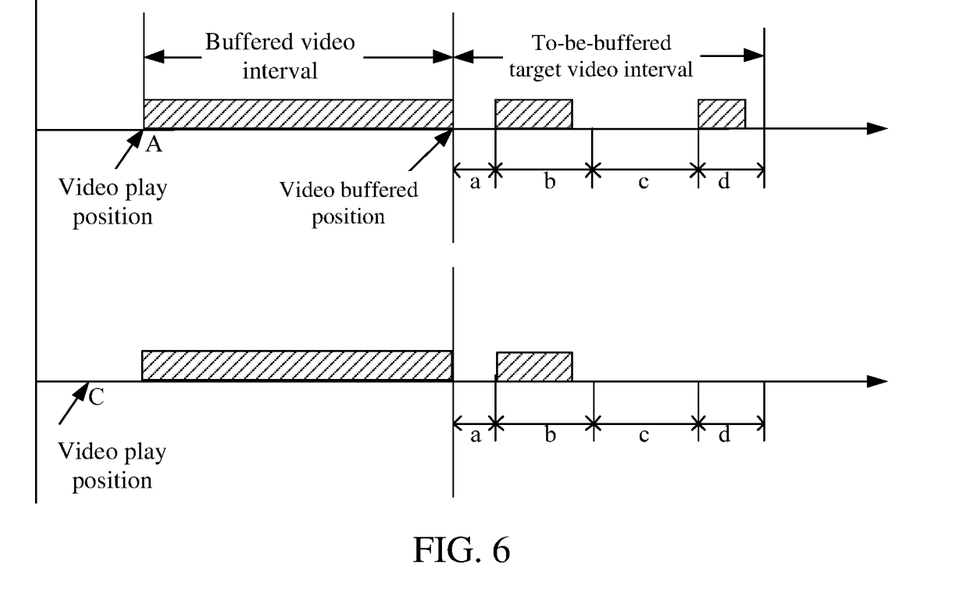
FIG. 6 is a schematic diagram of display of a buffered video interval and a to-be-buffered target video interval, according to yet other embodiments of the application.

In another example, as shown in FIG. 6, the video play position moves backward based on an operation triggered by the user, that is, moving backward from the play position A to a play position C. The buffered video interval changes, and correspondingly, the to-be-buffered target video interval also changes. The length value of the to-be-buffered target video interval is the length value of the minimum buffered video interval.

Referring to FIG. 6, a schematic diagram located on an upper half part of FIG. 6 is a schematic diagram of the buffered video interval and the to-be-buffered target video interval before the video play position changes. A schematic diagram located on a lower half part of FIG. 6 is a schematic diagram of the buffered video interval and the to-be-buffered target video interval after the video play position changes.

As shown in FIG. 6, before the to-be-buffered target video interval changes, the fragment a, the fragment b, the fragment c, and the fragment d of the to-be-buffered target video interval are being respectively buffered. After the to-be-buffered target video interval changes, none of the four fragments is located in the to-be-buffered target video interval anymore. Accordingly, buffering of the four fragments is canceled. In some embodiments, buffering of the fragment outside the to-be-buffered target video interval is canceled. In other embodiments, buffering of the fragment outside an extended to-be-buffered target video interval is canceled.

For example, the extended to-be-buffered target video interval is determined through the following steps: obtaining a second preset extension coefficient; and obtaining a second extended to-be-buffered target video interval based on the second preset extension coefficient and the to-be-buffered target video interval.

The second preset extension coefficient may be set to, for example, 1.1, 1.2, or 1.5 according to the video buffering requirements.

The fragment falling outside the second extended to-be-buffered target video interval includes two situations: one is that the entire piece of the fragment is not located in the second extended to-be-buffered target video interval anymore, and the other is that a part of the fragment falls outside the second extended to-be-buffered target video interval.

In the situation where the entire piece of the fragment is not located in the second extended to-be-buffered target video interval anymore, buffering of the fragment is canceled.

In the situation where a part of the fragment falls outside the second extended to-be-buffered target video interval, whether to cancel buffering of the fragment is determined according to whether a current buffered position of the fragment is located in the second extended to-be-buffered target video interval. When the current buffered position of the fragment is located in the second extended to-be-buffered target video interval, buffering of the fragment may continue. When the current buffered position of the fragment is not located in the second extended to-be-buffered target video interval, buffering of the fragment is canceled.

Buffering speeds of the fragments of the to-be-buffered target video interval may be different. If a buffering speed of a fragment is relatively low, a situation may occur that after another fragment is completely buffered, the fragment has not been completely buffered, causing problems that the buffered video interval grows slowly, and that the to-be-buffered target video interval cannot be further extended appropriately.

To solve the technical problems, in some embodiments of the application, the video buffering method further includes step S2800: performing secondary fragmentation on a fragment that is not completely buffered in the to-be-buffered target video interval, to add at least one new fragment, and respectively buffer the fragments obtained through the secondary fragmentation. In this way, the amount of the buffering task of the original fragment may be shared.

The fragment that is not completely buffered in the to-be-buffered target video interval may be a fragment with a buffering speed lower than a preset buffering speed threshold, or may be a fragment the length value of a remaining buffering interval of which is greater than a preset length value.

Figure 7:
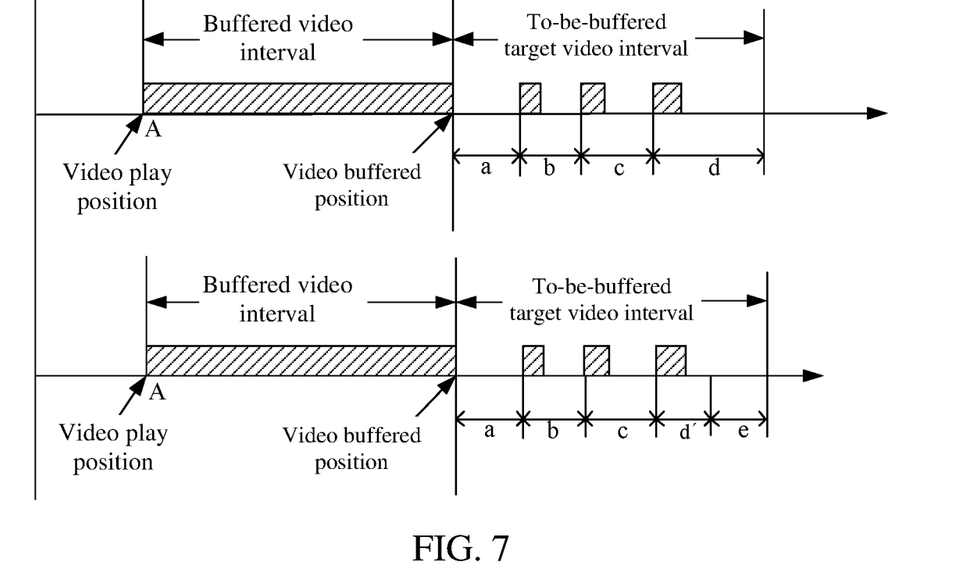
FIG. 7 is a schematic diagram of display of a buffered video interval and a to-be-buffered target video interval, according to still other embodiments of the application.

As shown in FIG. 7, the to-be-buffered target video interval includes four fragments, that is, a fragment a, a fragment b, a fragment c, and a fragment d. A buffering speed of the fragment d is lower than a preset buffering speed threshold. Secondary fragmentation is performed on the fragment d, to add a fragment e. The original fragment d is changed into a fragment d', and the fragment d' and the fragment e are respectively buffered.

In the video buffering method provided by the embodiments of the application, a buffered video interval is determined according to a video play position and a video buffered position; a to-be-buffered target video interval is determined based on the buffered video interval; fragmentation is performed on a video part that is not buffered, not fragmented, and in the to-be-buffered target video interval, to obtain at least one fragment; and each of the at least one fragment is buffered. In this manner of adaptive and dynamic fragmentation of a video, buffering time of the video decreases, and the problem of video playback stalling is effectively prevented.

Example

In the example, the video buffering method may include the following steps S801 to S802.

Step S801: determining a buffered video interval according to a video play position and a video buffered position.

Step S802: obtaining a length value of the buffered video interval, a length value of a minimum buffered video interval, and a preset proportionality coefficient.

Step S803: determining whether the length value of the buffered video interval is greater than the length value of the minimum buffered video interval.

When the length value of the buffered video interval is not greater than the length value of the minimum buffered video interval, step S804 is performed: determining the length value of the to-be-buffered target video interval to be the length value of the minimum buffered video interval.

When the length value of the buffered video interval is greater than the length value of the minimum buffered video interval, step S805 is performed: determining the length value of the to-be-buffered target video interval by using the length value of the buffered video interval and the preset proportionality coefficient.

Step S806: determining the to-be-buffered target video interval by using the length value of the to-be-buffered target video interval.

Step S807: determining whether there is any buffered video part in the to-be-buffered target video interval.

When a determining result is that there is a buffered video part in the to-be-buffered target video interval, step S808 is performed: extending the to-be-buffered target video interval by using a first preset extension coefficient, to obtain a first extended to-be-buffered target video interval.

Step S809: determining a length upper limit of a single fragment according to the pre-configured quantity of fragments and the length value of the to-be-buffered target video interval.

Step S810: performing fragmentation on a video part that is not buffered, not fragmented, and in the to-be-buffered target video interval or the first extended to-be-buffered target video interval by using the length upper limit of a single fragment, to obtain at least one fragment.

Step S811: respectively buffering each of the at least one fragment.

Step S812: determining whether buffering speeds of the fragments are lower than a preset buffering speed threshold.

When a buffering speed of a fragment is lower than the preset buffering speed threshold, step S813 is performed: performing secondary fragmentation on the fragment, to add at least one new fragment, and respectively buffering the fragments obtained through the secondary fragmentation.

Apparatus Embodiments

Figure 8:
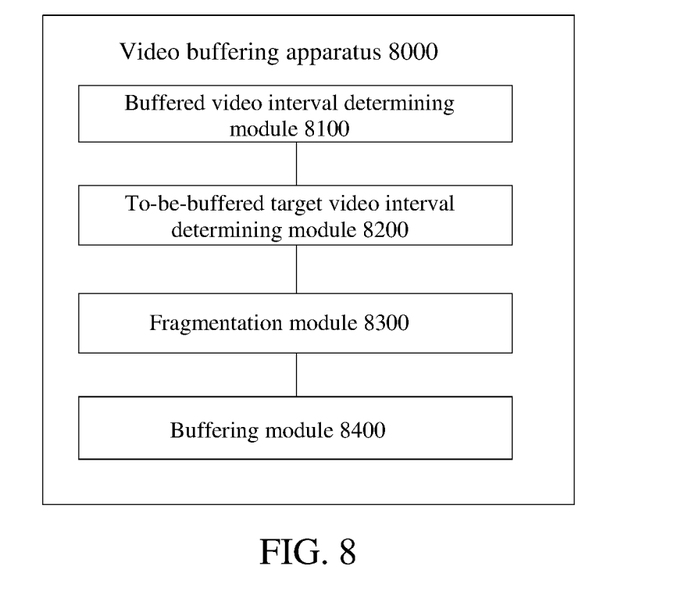
FIG. 8 is a block diagram of a video buffering apparatus, according to some embodiments of the application.

FIG. 8 is a block diagram of a video buffering apparatus according to some embodiments of the application.

As shown in FIG. 8, a video buffering apparatus 8000 of the embodiments may include a buffered video interval determining module 8100, a to-be-buffered target video interval determining module 8200, a fragmentation module 8300, and a buffering module 8400.

The buffered video interval determining module 8100 is configured to determine a buffered video interval according to a video play position and a video buffered position.

The to-be-buffered target video interval determining module 8200 is configured to determine a to-be-buffered target video interval based on the buffered video interval.

The fragmentation module 8300 is configured to perform fragmentation on a video part that is not buffered, not fragmented, and in the to-be-buffered target video interval, to obtain at least one fragment.

The buffering module 8400 is configured to buffer each of the at least one fragment.

In some embodiments, the to-be-buffered target video interval determining module 8200 is further configured to: obtain a length value of the buffered video interval and a preset proportionality coefficient; determine a length value of the to-be-buffered target video interval; and determine the to-be-buffered target video interval by using the length value of the to-be-buffered target video interval.

In some embodiments, the to-be-buffered target video interval determining module 8200 is further configured to: obtain a length value of a preset minimum buffered video interval; compare the length value of the buffered video interval with the length value of the minimum buffered video interval, to obtain a comparison result; when the comparison result is that the length value of the buffered video interval is greater than the length value of the minimum buffered video interval, determine a length value of the to-be-buffered target video interval; and when the comparison result is that the length value of the buffered video interval is not greater than the length value of the minimum buffered video interval, determine the length value of the to-be-buffered target video interval to be the length value of the minimum buffered video interval.

In some embodiments, the to-be-buffered target video interval determining module 8200 is further configured to determine whether there is any buffered video part in the to-be-buffered target video interval, to obtain a determining result; and extend the to-be-buffered target video interval by using a first preset extension coefficient when the determining result is that there is a buffered video part in the to-be-buffered target video interval, to obtain a first extended to-be-buffered target video interval.

In some embodiments, the fragmentation module 8300 is further configured to obtain the pre-configured quantity of fragments and the length value of the to-be-buffered target video interval; determine a length upper limit of a single fragment according to the pre-configured quantity of fragments and the length value of the to-be-buffered target video interval; and perform fragmentation on a video part that is not buffered, not fragmented, and in the to-be-buffered target video interval by using the length upper limit of a single fragment, to obtain at least one fragment.

In some embodiments, the fragmentation module 8300 is further configured to perform secondary fragmentation on a fragment that is not completely buffered in the to-be-buffered target video interval, to add at least one new fragment, and respectively buffer the fragments obtained through the secondary fragmentation. In this way, the amount of the buffering task of the original fragment may be shared, thereby avoiding the problems that the buffered video interval grows slowly, and that the to-be-buffered target video interval cannot be further extended appropriately.

In some embodiments, when the to-be-buffered target video interval changes, the video buffering apparatus further includes a buffering canceling module. The buffering canceling module is configured to cancel buffering of the fragment outside the to-be-buffered target video interval. In this way, buffering of a fragment at an inappropriate position may be canceled in time, thereby prevent buffering of a fragment at an inappropriate position from occupying resources.

In other embodiments, the buffering canceling module is further configured to cancel buffering of the fragment outside the second extended to-be-buffered target video interval. The second extended to-be-buffered target video interval is determined through the following steps: obtaining a second preset extension coefficient; and obtaining a second extended to-be-buffered target video interval based on the second preset extension coefficient and the to-be-buffered target video interval.

Electronic Device Embodiments

In some embodiments, an electronic device 1000 may include the video buffering apparatus 8000 according to any embodiment of the application, and is configured to perform the video buffering method according to any embodiment of the application.

In another embodiment, the electronic device 1000 may include a processor 1100 and a memory 1200. The memory 1200 is configured to store executable instructions, and the processor 1100 is configured to run, under control of the instructions, the electronic device 1000 to perform the video buffering method according to any embodiment of the application.

<Computer Readable Storage Medium>

In some embodiments, a computer readable storage medium is further provided, storing a computer program, the computer program, when executed by a processor, implementing the video buffering method according to any embodiment of the application.

The application may be a system, a method, and/or a computer program product. The computer program product may include a computer readable storage medium, carrying computer readable program instructions used to enable a processor to implement aspects of the application.

The computer readable storage medium may be a physical device maintaining and storing instructions used by an instruction execution device. The computer readable storage medium may be, for example, but is not limited to, an electrical storage device, a magnetic storage device, an optical storage device, an electromagnetic storage device, a semiconductor storage device, or any appropriate combination thereof. More examples of the computer readable storage medium (a non-exhaustive list) include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical coding device such as a punched card or a convex structure in a groove having an instruction stored thereon, or any appropriate combination thereof. The computer readable storage medium used herein is not interpreted as an instantaneous signal itself, for example, a radio wave or another freely transmitted electromagnetic wave, an electromagnetic wave transmitted through a waveguide or another transmission medium (for example, an optical pulse through an optical fiber cable), or an electrical signal transmitted through a wire.

The computer readable program instructions described herein may be downloaded from a computer readable storage medium to computing/processing devices, or downloaded to an external computer or an external storage device through a network such as the Internet, a local area network, a wide area network, and/or a wireless network. The network may include a copper transmission cable, optical fiber transmission, wireless transmission, a router, a firewall, a switch, a gateway computer, and/or an edge server. A network adapter card or a network interface in each computing/processing device receives computer readable program instructions from the network, and conveys the computer readable program instructions, to store the computer readable program instructions in a computer readable storage medium of each computing/processing device.

The computer program instructions used to perform operations of the application may be assembly instructions, instruction set architecture (ISA) instructions, machine instructions, machine-related instructions, micro code, firmware instructions, status configuration data, or source code or target code written in any combination of one or more programming languages. The programming languages include an object-oriented programming language such as Smalltalk or C++, and a common procedural programming language such as the "C" language or a similar programming language. The computer readable program instructions may be completely executed on a user computer, partially executed on a user computer, executed as an independent software package, partially executed on a user computer and partially executed on a remote computer, or completely executed on a remote computer or server. In the situation involving a remote computer, the remote computer may be connected to a user computer through any type of network including a local area network (LAN) or a wide area network (WAN), or may be connected to an external computer (for example, through the Internet by using an Internet service provider). In some embodiments, an electronic circuit, such as a programmable logic circuit, a field programmable gate array (FPGA), or a programmable logic array (PLA), is customized by using status information of the computer readable program instructions. The electronic circuit may execute computer readable program instructions, to implement aspects of the application.

Aspects of the application are described with reference to the flowcharts and/or block diagrams of the method, the apparatus (system), and the computer program product according to the embodiments of the application. It should be understood that, each block of the flowcharts and/or block diagrams and a combination of blocks of the flowcharts and/or block diagrams may be implemented by computer readable program instructions.

The computer readable program instructions may be provided to a general-purpose computer, a special-purpose computer, or a processor of another programmable data processing apparatus, to produce a machine, so that the instructions may generate, when executed through the computer or the processor of another programmable data processing apparatus, an apparatus implementing functions/actions specified in one or more blocks in the flowcharts and/or block diagrams. The computer readable program instructions may further be stored in a computer readable storage medium. The instructions enable a computer, a programmable data processing apparatus, and/or another device to work in a manner. Therefore, a computer readable medium storing the instructions includes a product containing instructions implementing aspects of functions/actions specified in one or more blocks in the flowcharts and/or block diagrams.

The computer readable program instructions may further be loaded to a computer, another programmable data processing apparatus, or another device, so that a series of operating steps is performed in the computer, another programmable data processing apparatus, or another device, to generate a procedure implemented by the computer. As a result, the instructions in the computer, another programmable data processing apparatus, or another device implement the functions/actions specified in one or more blocks in the flowcharts and/or block diagrams.

The flowcharts and block diagrams in the accompanying drawings show architectures, functions, and operations that may be implemented for the system, the method, and the computer program product according to a plurality of embodiments of the application. In this regard, each block in a flowchart or a block diagram may represent a module, a program segment, or a part of instructions. The module, the program segment, or the part of the instructions includes one or more executable instructions used for implementing specified logic functions. In some alternative implementations, functions shown in blocks may also be performed in an order different from that shown in the accompanying drawings. For example, two consecutive blocks may actually be performed basically concurrently, or may alternatively be performed in a contrary sequence sometimes, depending on related functions. It should also be noted that, each block in a block diagram and/or a flowchart and a combination of blocks in the block diagram and/or the flowchart may be implemented by using a dedicated hardware-based system configured to perform a specified function or action, or may be implemented by using a combination of dedicated hardware and a computer instruction. It is known to a person skilled in the art that, implementing through a hardware manner, implementing through a software manner, and implementing through a manner combining software and hardware are equivalent.

The embodiments of the application have been described above. The foregoing descriptions are illustrative rather than exhaustive, and are not limited to the disclosed embodiments. A large quantity of modifications and changes are obvious to a person of ordinary skill in the art without departing from the scope and spirit of the described embodiments. Terms used in this specification are selected to best explain the principles of the embodiments, actual applications, or technical improvements to technologies in the market, or to enable another person of ordinary skill in the art to understand the embodiments disclosed in this specification. The scope of the application is defined by the appended claims.

What is claimed is:

1. A video buffering method, comprising:
    determining a buffered video interval in a video according to a video play position and a video buffered position of the video;
    determining a target video interval in the video based on the buffered video interval;
    performing fragmentation on a video part that is not buffered, not fragmented, and in the target video interval, to obtain at least one fragment, wherein the performing fragmentation comprises:
        obtaining a pre-configured quantity of fragments and a length value of the target video interval,
        determining a length upper limit of a single fragment according to the pre-configured quantity of fragments and the length value of the target video interval, and
        performing fragmentation on the video part that is not buffered, not fragmented, and in the target video interval by using the length upper limit of a single fragment, to obtain the at least one fragment; and
    buffering each of the at least one fragment.

2. The method according to claim 1, wherein determining a target video interval in the video based on the buffered video interval comprises:
    obtaining a length value of the buffered video interval and a preset proportionality coefficient;
    determining a length value of the target video interval by using the length value of the buffered video interval and the preset proportionality coefficient; and
    determining the target video interval by using the length value of the target video interval and the video buffered position of the video.

3. The method according to claim 2, further comprising:
    obtaining a length value of a preset minimum buffered video interval;
    comparing the length value of the buffered video interval with the length value of the minimum buffered video interval;
    determining the length value of the target video interval by using the length value of the buffered video interval and the preset proportionality coefficient in response to the length value of the buffered video interval being greater than the length value of the minimum buffered video interval; and
    determining the length value of the target video interval to be the length value of the minimum buffered video interval in response to the length value of the buffered video interval being not greater than the length value of the minimum buffered video interval.

4. The method according to claim 1, further comprising:
    determining whether there is any buffered video part in the target video interval;
    in response to determining that there is a buffered video part in the target video interval, extending the target video interval by using a first preset extension coefficient to obtain a first extended to be buffered target video interval; and
    performing fragmentation on a video part that is not buffered, not fragmented and in the first extended target video interval to obtain at least one fragment.

5. The method according to claim 1, further comprising:
    canceling buffering of a fragment outside the target video interval.

6. The method according to claim 5, wherein canceling buffering of a fragment outside the target video interval comprises:
    determining whether a fragment falls outside the to be buffered target video interval;
    in response to determining that a part of the fragment falls outside the target video interval, determining whether a buffered position of the fragment is located in the target video interval; and
    in response to determining that a buffered position of the fragment is not located in the target video interval, canceling buffering of the fragment.

7. The method according to claim 4, further comprising:
    obtaining a second preset extension coefficient;
    obtaining a second extended target video interval based on the second preset extension coefficient and the target video interval; and
    cancelling buffering of a fragment outside the second extended target video interval.

8. The method according to claim 1, further comprising:
    performing secondary fragmentation on a fragment that is not completely buffered and in the target video interval, to add at least one new fragment; and
    respectively buffering the at least one new fragment obtained through the secondary fragmentation.

9. A video buffering apparatus comprising: one or more processors and one or more non-transitory computer-readable memories coupled to the one or more processors and configured with instructions executable by the one or more processors to cause the apparatus to perform operations comprising:
    determining a buffered video interval in a video according to a video play position and a video buffered position of the video;
    determining a target video interval in the video based on the buffered video interval;
    performing fragmentation on a video part that is not buffered, not fragmented, and in the target video interval, to obtain at least one fragment, wherein the performing fragmentation comprises:
        obtaining a pre-configured quantity of fragments and a length value of the target video interval,
        determining a length upper limit of a single fragment according to the pre-configured quantity of fragments and the length value of the target video interval, and
        performing fragmentation on the video part that is not buffered, not fragmented, and in the target video interval by using the length upper limit of a single fragment, to obtain the at least one fragment; and
    buffering each of the at least one fragment.

10. The apparatus according to claim 9, wherein determining a target video interval in the video based on the buffered video interval comprises:

obtaining a length value of the buffered video interval and a preset proportionality coefficient;

determining a length value of the target video interval by using the length value of the buffered video interval and the preset proportionality coefficient; and determining the target video interval by using the length value of the buffered target video interval and the video buffered position of the video.

11. The apparatus according to claim 10, wherein the operations further comprise:

obtaining a length value of a preset minimum buffered video interval;

comparing the length value of the buffered video interval with the length value of the minimum buffered video interval;

determining the length value of the target video interval by using the length value of the buffered video interval and the preset proportionality coefficient in response to the length value of the buffered video interval being greater than the length value of the minimum buffered video interval; and determining the length value of the target video interval to be the length value of the minimum buffered video interval in response to the length value of the buffered video interval being not greater than the length value of the minimum buffered video interval.

12. The apparatus according to claim 9, wherein the operations further comprise:

determining whether there is any buffered video part in the target video interval;

in response to determining that there is a buffered video part in the target video interval, extending the target video interval by using a first preset extension coefficient to obtain a first extended target video interval; and performing fragmentation on a video part that is not buffered, not fragmented and in the first extended target video interval to obtain at least one fragment.

13. The apparatus according to claim 9, wherein the operations further comprise:

canceling buffering of a fragment outside the target video interval.

14. The apparatus according to claim 13, wherein canceling buffering of a fragment outside the target video interval comprises:

determining whether a fragment falls outside the target video interval;

in response to determining that a part of the fragment falls outside the target video interval, determining whether a buffered position of the fragment is located in the target video interval; and in response to determining that a buffered position of the fragment is not located in the to be buffered target video interval, canceling buffering of the fragment.

15. The apparatus according to claim 12, wherein the operations further comprise:

obtaining a second preset extension coefficient;

obtaining a second extended target video interval based on the second preset extension coefficient and the target video interval; and canceling buffering of a fragment outside the second extended target video interval.

16. The apparatus according to claim 9, wherein the operations further comprise:

performing secondary fragmentation on a fragment that is not completely buffered and in the target video interval, to add at least one new fragment; and respectively buffering the at least one new fragment obtained through the secondary fragmentation.

17. A non-transitory computer-readable storage medium configured with instructions executable by one or more processors to cause the one or more processors to perform operations comprising:

determining a buffered video interval in a video according to a video play position and a video buffered position of the video;

determining a target video interval in the video based on the buffered video interval;

performing fragmentation on a video part that is not buffered, not fragmented, and in the target video interval, to obtain at least one fragment; wherein the performing fragmentation comprises:

obtaining a pre-configured quantity of fragments and a length value of the target video interval, determining a length upper limit of a single fragment according to the pre-configured quantity of fragments and the length value of the target video interval, and performing fragmentation on the video part that is not buffered, not fragmented, and in the target video interval by using the length upper limit of a single fragment, to obtain at least one fragment; and buffering each of the at least one fragment.

18. The non-transitory computer-readable storage medium according to claim 17, wherein determining a target video interval in the video based on the buffered video interval comprises:

obtaining a length value of the buffered video interval and a preset proportionality coefficient;

determining a length value of the target video interval by using the length value of the buffered video interval and the preset proportionality coefficient; and determining the target video interval by using the length value of the target video interval and the video buffered position of the video.

* * * * *

UNITED STATES PATENT AND TRADEMARK OFFICE
CERTIFICATE OF CORRECTION

PATENT NO. : 11,218,741 B2
APPLICATION NO. : 16/889707
DATED : January 4, 2022
INVENTOR(S) : Zhang Page 1 of 1

It is certified that error appears in the above-identified patent and that said Letters Patent is hereby corrected as shown below:

In the Claims

Claim 4, Column 16, Line 7:
"first extended to be buffered target" should read -- first extended target --.

Claim 6, Column 16, Lines 17-18:
"falls outside the to be buffered target video interval" should read -- falls outside the target video interval --.

Claim 10, Column 17, Line 7:
"value of the buffered target video interval" should read -- value of the target video interval --.

Claim 14, Column 17, Line 52:
"fragment is not located in the to be buffered target video interval" should read -- fragment is not located in the target video interval --.

Signed and Sealed this
Eighth Day of March, 2022

Drew Hirshfeld
*Performing the Functions and Duties of the
Under Secretary of Commerce for Intellectual Property and
Director of the United States Patent and Trademark Office*